United States Patent
Amit et al.

(10) Patent No.: US 10,469,581 B2
(45) Date of Patent: Nov. 5, 2019

(54) FILE STORAGE PROTOCOLS HEADER TRANSFORMATION IN RDMA OPERATIONS

(71) Applicant: INTERNATIONAL BUSINESS MACHINES CORPORATION, Armonk, NY (US)

(72) Inventors: Jonathan Amit, Omer (IL); Vladislav Drouker, Holon (IL); Saar Ron, Kiryat Ono (IL); Gal Rosen, Petach Tikva (IL)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 367 days.

(21) Appl. No.: 14/589,758

(22) Filed: Jan. 5, 2015

(65) Prior Publication Data
US 2016/0197992 A1 Jul. 7, 2016

(51) Int. Cl.
G06F 13/28 (2006.01)
H04L 29/08 (2006.01)
H04L 29/06 (2006.01)
G06F 3/06 (2006.01)

(52) U.S. Cl.
CPC ........ *H04L 67/1097* (2013.01); *G06F 3/0607* (2013.01); *G06F 3/0661* (2013.01); *G06F 3/0671* (2013.01); *G06F 13/28* (2013.01); *H04L 69/08* (2013.01); *H04L 69/22* (2013.01); *H04L 69/326* (2013.01); *H04L 69/329* (2013.01)

(58) Field of Classification Search
CPC .................................................. G06F 3/0607
USPC .......................................................... 709/212
See application file for complete search history.

(56) References Cited

U.S. PATENT DOCUMENTS

| | | | |
|---|---|---|---|
| 6,226,680 B1 | 5/2001 | Boucher et al. | |
| 7,181,439 B1 | 2/2007 | Lent et al. | |
| 8,073,899 B2 | 12/2011 | Grier et al. | |
| 2003/0126247 A1* | 7/2003 | Strasser | G06F 11/1458 709/223 |
| 2006/0034283 A1 | 2/2006 | Ko et al. | |
| 2006/0136570 A1* | 6/2006 | Pandya | G06F 17/30985 709/217 |
| 2006/0206609 A1* | 9/2006 | Ganesan | H04L 63/0428 709/226 |
| 2006/0248047 A1* | 11/2006 | Grier | G06F 3/0607 |
| 2007/0220222 A1* | 9/2007 | Boldt | H03M 7/3084 711/162 |
| 2013/0007180 A1 | 1/2013 | Talpey et al. | |
| 2014/0169169 A1* | 6/2014 | Almog | H04L 47/2441 370/235 |

OTHER PUBLICATIONS

DeBergalis, Matt, et al., "The Direct Access File System," FAST, vol. 3, pp. 175-188, 2003.

(Continued)

*Primary Examiner* — Vivek Srivastava
*Assistant Examiner* — Hien V Doan
(74) *Attorney, Agent, or Firm* — Griffiths & Seaton PLLC

(57) ABSTRACT

Various embodiments for efficient data transfer in a Remote Direct Memory Access (RDMA) operation by a memory device. A file protocol header of the data is replaced with a block protocol header. The block protocol header enables transfer over a direct data path through a transport layer from a source to a target without outside manipulation by a central processing unit (CPU).

18 Claims, 4 Drawing Sheets

(56) References Cited

OTHER PUBLICATIONS

Liang, Shuang, et al., "High Performance Block I/O for Global File System (GFS) with Infiniband RDMA," International Conference on Parallel Processing, 2006, ICPP 2006, pp. 391-398, IEEE, 2006.
Recio, R., et al., "A Remote Direct Memory Access Protocol Specification," RFC 5040, Oct. 2007, 67 pages.

* cited by examiner

FILE STORAGE PROTOCOLS HEADER TRANSFORMATION IN RDMA OPERATIONS

BACKGROUND OF THE INVENTION

Field of the Invention

The present invention relates in general computing systems, and more particularly to, various embodiments for efficient data transfer in clustered computing systems implementing Remote Direct Memory Access (RDMA) operations.

Description of the Related Art

Today with modern technology, large volumes of data are storable on disk and flash drives; these drives can exist as a solo entity, or as part of a broader make up within a larger storage environment, such as a computing storage network. As the sheer volume of data in today's information-based society continues to increase, so have the size and complexity of computing and computing storage networks. Today it is not uncommon for groups of several individual computers, or clusters, to facilitate data storage and transfer.

SUMMARY OF THE INVENTION

Current file storage arrays handle Input/Output (I/O) requests in an indirect way in isolated layers. In doing so, latencies in the I/O requests may result, and performance may be degraded. The implementation of new flash technologies comes with a corresponding need for file storage to be able to accommodate millions of I/O operations with ultra low latency.

Remote Direct Memory Access (RDMA) is a direct memory access operation from the memory of one computer into the memory of another computer without the involvement of either computer's Operating System (OS). RDMA data transfer permit high throughput, low latency networking, which is especially advantageous in storage solutions, for example.

File storage arrays typically use an interrupt-driven model. This model has accompanying potential challenges such as bottlenecks and increased latency. Storage array architectures also use a voluminous amount of context switches. These switching operations are performed between different user and kernel threads in the execution path of a single file operation request. This tends to drive latency even higher, degrading performance further.

Accordingly, in view of the foregoing, a need exists for a mechanism whereby large amounts of data and/or many I/O operations may be conducted without jeopardizing latency in computing storage environments.

To address this need, various mechanisms for efficient data transfer in a Remote Direct Memory Access (RDMA) operation by a memory device are provided. In one embodiment, by way of example only, a method for efficient data transfer in a RDMA operation by a memory device is provided. A file protocol header of the data is replaced with a block protocol header. The block protocol header enables transfer over a direct data path through a transport layer from a source to a target without outside manipulation by a central processing unit (CPU).

Other system and computer program product embodiments are provided and supply related advantages.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

As previously mentioned, current file storage arrays handle Input/Output (I/O) requests in an indirect way in isolated layers. In doing so, latencies in the I/O requests may result, and performance may be degraded. The implementation of new flash technologies comes with a corresponding need for file storage to be able to accommodate millions of I/O operations with ultra low latency.

Remote Direct Memory Access (RDMA) is a direct memory access operation from the memory of one computer into the memory of another computer without the involvement of either computer's Operating System (OS). RDMA data transfer permit high throughput, low latency networking, which is especially advantageous in storage solutions, for example.

File storage arrays typically use an interrupt-driven model. This model has accompanying potential challenges such as bottlenecks and increased latency. Storage array architectures also use a voluminous amount of context switches. These switching operations are performed between different user and kernel threads in the execution path of a single file operation request. This tends to drive latency even higher, degrading performance further.

Accordingly, in view of the foregoing, a need exists for a mechanism whereby large amounts of data and/or many I/O operations may be conducted without jeopardizing latency in computing storage environments.

The illustrated embodiments address this need with the introduction of innovative mechanisms of direct data flow for file storage arrays, achieving ultra-low latency in file storage. This is performed, for example, by using header transformation from file protocol to block protocol over RDMA read and RDMA write operations.

The mechanisms of the illustrated embodiments enable the facilitation and processing of millions of Input/Output Operations Per Second (IOPS), and deliver ultra-low latency. The mechanisms enable the use of newer flash technology for file operation without the loss of any performance characteristics of the newer technology.

In one embodiment, these benefits are achieved by use of a new monolithic model, in which the transport layer is knowledgeable about the application layer, and vice versa. This shared knowledge between layers results in giving up abstraction for better performance.

The Central Processing Unit, or CPU, in the illustrated embodiments, does not process the copy of the data. Rather, the data is transferred using RDMA on both ingress and egress endpoints.

Figure 1:
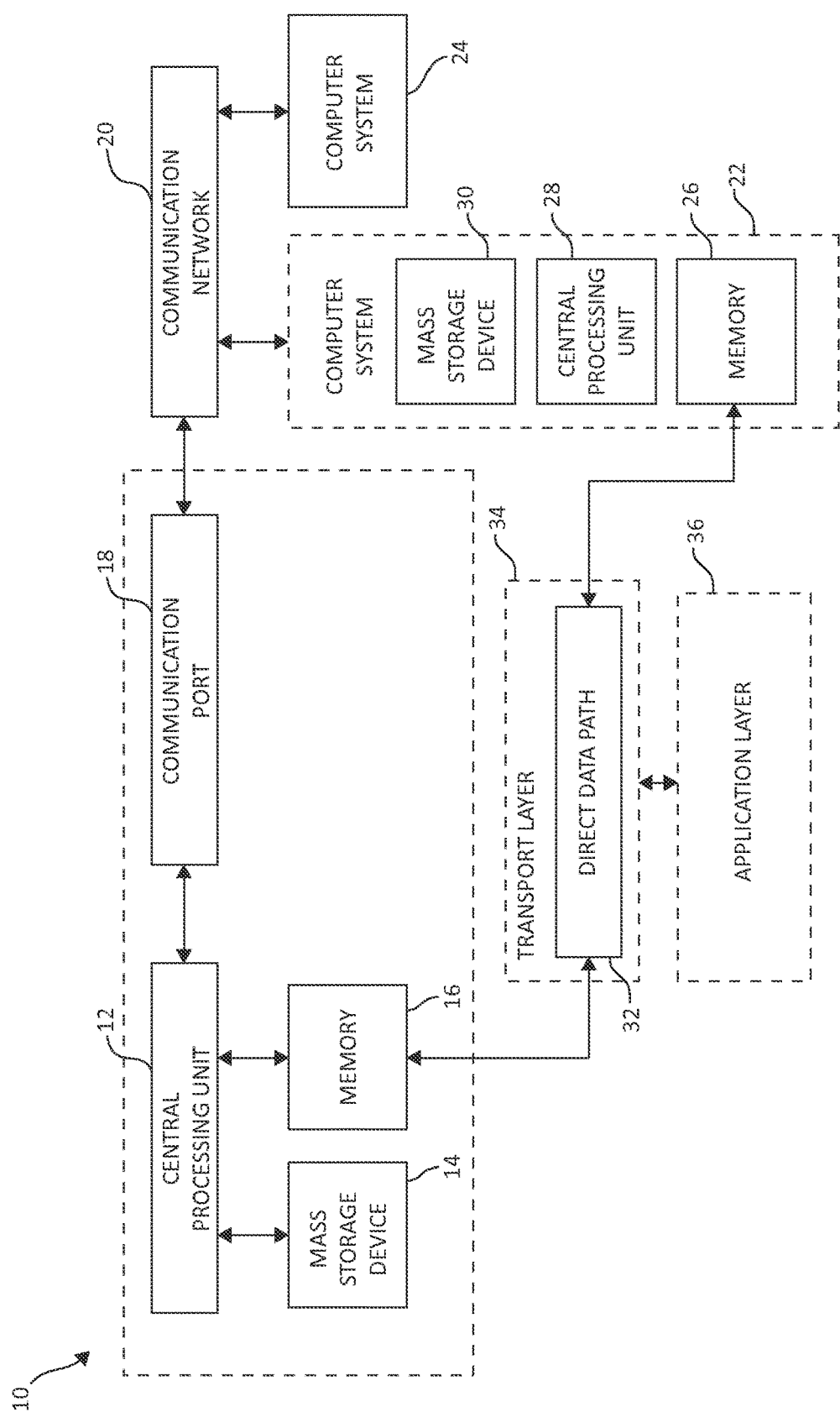
FIG. 1 is a block diagram showing an exemplary hardware structure for effecting efficient data transfer in Remote Direct Memory Access (RDMA) operations, in which aspects of the present invention may be realized.

Turning now to FIG. 1, exemplary architecture 10 of a computing system environment is depicted. Architecture 10 may, in one embodiment, be implemented at least as part of a system for effecting mechanisms of the present invention. The computer system 10 includes central processing unit (CPU) 12, which is connected to communication port 18 and memory device 16. The communication port 18 is in communication with a communication network 20. The communication network 20 and storage network may be configured to be in communication with server (hosts) 24 and storage systems, which may include storage devices 14. The storage systems may include hard disk drive (HDD) devices, solid-state devices (SSD) etc., which may be configured in a redundant array of independent disks (RAID). The communication port 18, communication network 20, and other components not pictured for the sake of brevity but known to the skilled artisan may include such hardware components as fibre channel cabling, fibre channel ports, Host-Bus Adapters (HBAs), Converged Network Adapters (CNAs), network switches and switching components, and similar communications mechanisms known to one of ordinary skill in the art. Various aspects of the illustrated embodiments may be realized using one or more of these components as will be further described.

The operations as described below may be executed on storage device(s) 14, located in system 10 or elsewhere and may have multiple memory devices 16 working independently and/or in conjunction with other CPU devices 12. Memory device 16 as presented herein may include such memory as electrically erasable programmable read only memory (EEPROM), a device that is tasked with performing RDMA operations (such as a RDMA card), or a host of related devices. Memory device 16 and storage devices 14 are connected to CPU 12 via a signal-bearing medium. In addition, CPU 12 is connected through communication port 18 to a communication network 20, having an attached plurality of additional computer host systems 24. In addition, memory device 16 and the CPU 12 may be embedded and included in each component of the computing system 10. Each storage system may also include separate and/or distinct memory devices 16 and CPU 12 that work in conjunction or as a separate memory device 16 and/or CPU 12.

Architecture 10 may be considered to represent part of a cluster of computers, where the CPU 12 is in communication with the CPU 28 and mass storage device 30 in another computer system 22. Also shown as part of architecture 10 is a portion of transport layer 34, and application layer 36, with direct data path 32 facilitating data transfer between memories 16 and 26 as shown.

The block architecture, while one of ordinary skill would appreciate does not necessarily illustrate an entirety of possible computing components in a clustered computing environment, is meant to depict such functionality as relevant to the illustrated embodiments. For example, the portion of application layer 36 is shown in communication with portion of transport layer 34. This is intended to show from a block diagram perspective the monolithic model described previously, where the transport layer 34 is made to be knowledgeable about the application layer 36, and vice versa. Specific functionality associated with the memories 16 and 26, as well as the direct data path 32, will be further described.

Figure 2:
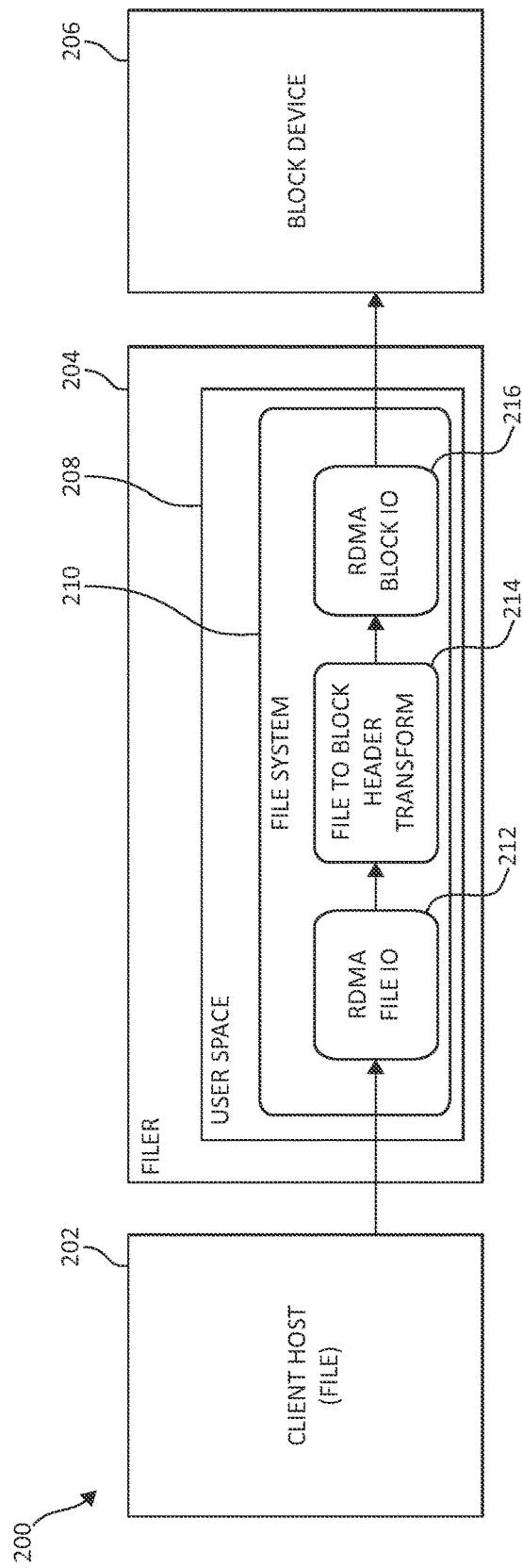
FIG. 2 is a block diagram of exemplary file to block header transformation, in which aspects of the present invention may be realized.

FIG. 2, following, illustrates in block diagram form, an exemplary transformation 200 from a file protocol device 202 in a client host through the depicted processes to become a block protocol device 206. More specifically, transformation 200 depicts a filer 204 with incorporated user space 208 and file system 210, as would be understood by one of ordinary skill in the art.

In file system 210, the file protocol device 202 enters the transformation process by virtue of the RDMA file Input/Output (I/O) function 212. As a subsequent step in the process, the file undergoes a file-to-block header transformation operation 214, where the appropriate block protocol header is created and replaced in the file protocol header space. In a subsequent step in the process, the RDMA block I/O function 216 operates to complete the transformation from file protocol device to block protocol device 206.

Figure 3:
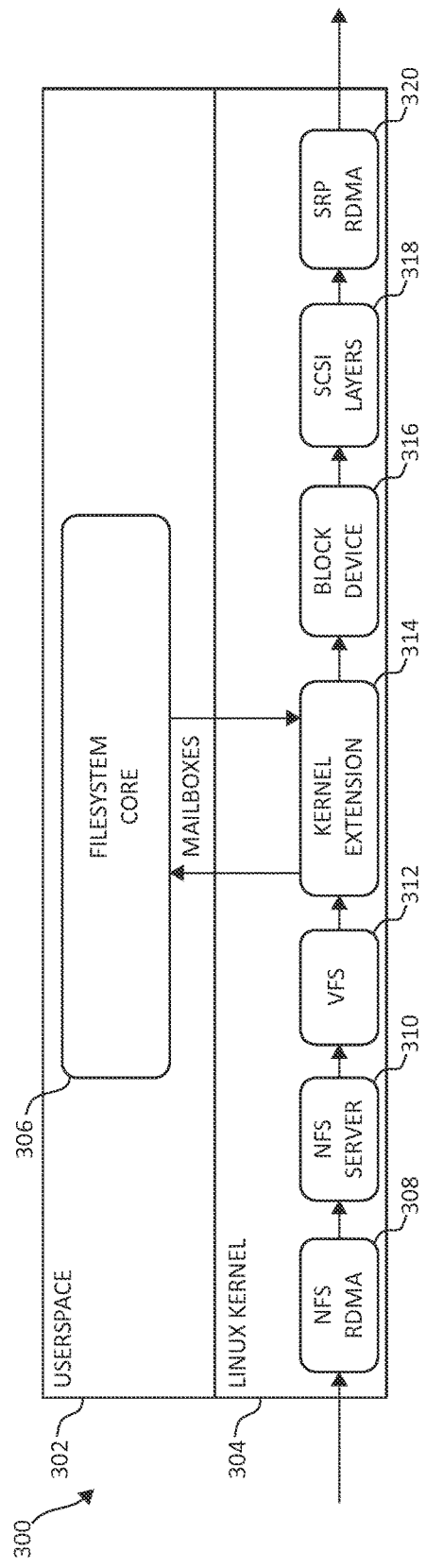
FIG. 3 is a block diagram of conventional data transfer in a file system, such as a Global Parallel File System (GPFS)

FIG. 3, following, illustrates, again in block diagram form, an exemplary conventional data movement in the form of an I/O request 300 through a file system, such as a Global Parallel File System (GPFS) (but may include any generic file system), for comparison's sake with FIG. 4, which later follows and will be subsequently described. While FIG. 3 and FIG. 4 may describe functionality relevant to a GPFS, one of ordinary skill in the art will appreciate that various mechanisms of the illustrated embodiments may be applicable to any file system implementation, which may vary depending on a particular situation.

Request 300 is shown in the context of user space 302, the kernel space 304, and the filesystem core 306. The request 300 is first received as a Network File System (NFS) Remote Data Memory Access (RDMA) operation 308 as shown, which is made to/passed to the relevant NFS server 310, which then is passed to the Virtual File System (VFS) 312, and then provided as a kernel extension 314.

At this point, mailboxes/mailbox message handling allows for communication of the appropriate kernel extension 314 previously described by the filesystem core 306. The message handling is passed to and from the filesystem core 306 to the extension 314, at which point a block device is constructed 316. The block device 316 is then made to communicate through one or more Small Computing Systems Interface (SCSI) layer (such as a SCSI application layer, SCSI Transport Protocol Layer (STPL), or SCSI Interconnect layer (SIL). The block device is then passed to another computer, for example, using the SCSI RDMA Protocol (SRP) RDMA operation 320.

Figure 4:
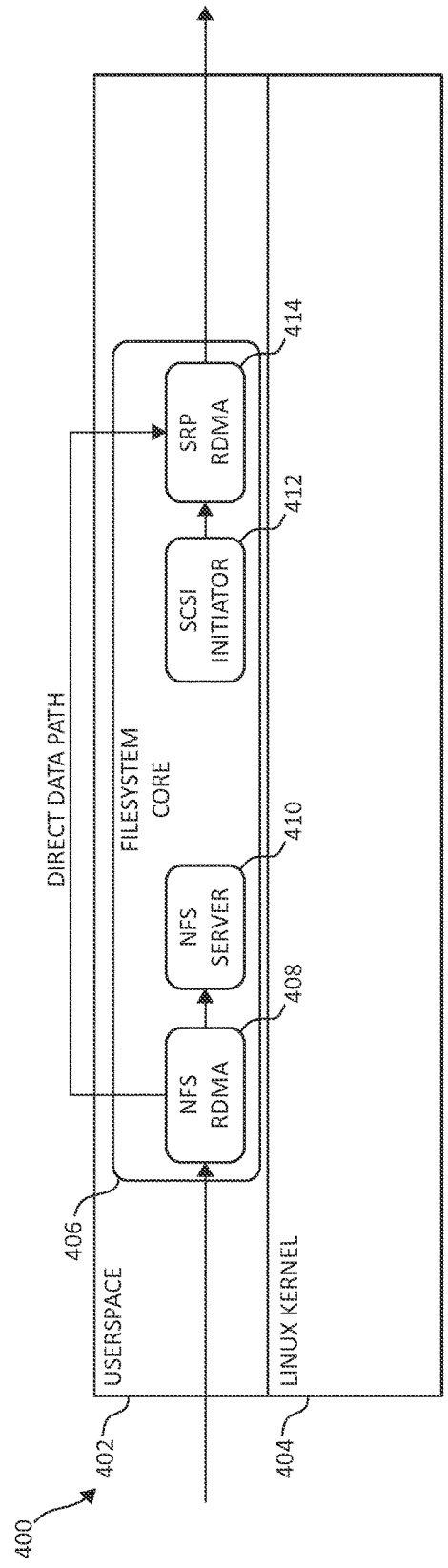
FIG. 4 is a block diagram of direct data path data transfer in a file system, in which aspects of the present invention may be realized.

FIG. 4, following, and in comparison, illustrates, again in block diagram form, exemplary data movement in a filesystem whereby various mechanisms of the present invention are implemented. In FIG. 4, user space 402 and the kernel space 404 are again depicted. Request 400 is received in the user space 402, and thereby initiated as an NFS RDMA operation 408, in conjunction with operations performed by the affiliated NFS server 410.

In contrast to the various additional processing steps shown in FIG. 3, previously, such as the involvement of a VFS 312, and the kernel extension 314, the processing steps shown in FIG. 4 are streamlined. Here, a direct data path connects the NFS RDMA operation 408 with an SRP RDMA operation that is performed with the facilitation of an SCSI initiator 412. The data may then be sent to another computer using the SRP RDMA protocol 414.

Figure 5:
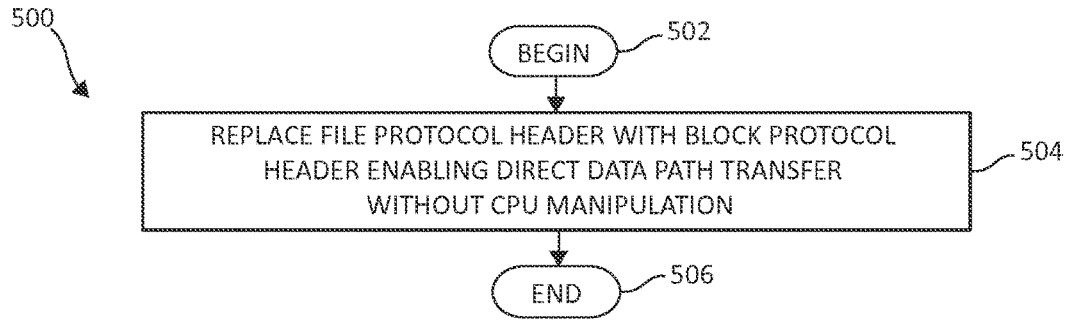
FIG. 5 is a flow chart diagram of an exemplary method for header transformation and direct data path data transfer, here again in which aspects of the present invention may be realized.

Turning now to FIG. 5, an exemplary method for effecting efficient data transfer through header transformation functionality as previously described as method 500. Method 500 begins (Step 502) with the replacement of a file protocol header with a block protocol header, enabling direct data path transfer without CPU manipulation (step 504). It is important to note that only the header information is substituted, and the underlying data itself is untouched. The method 500 then ends (step 506).

Figure 6:
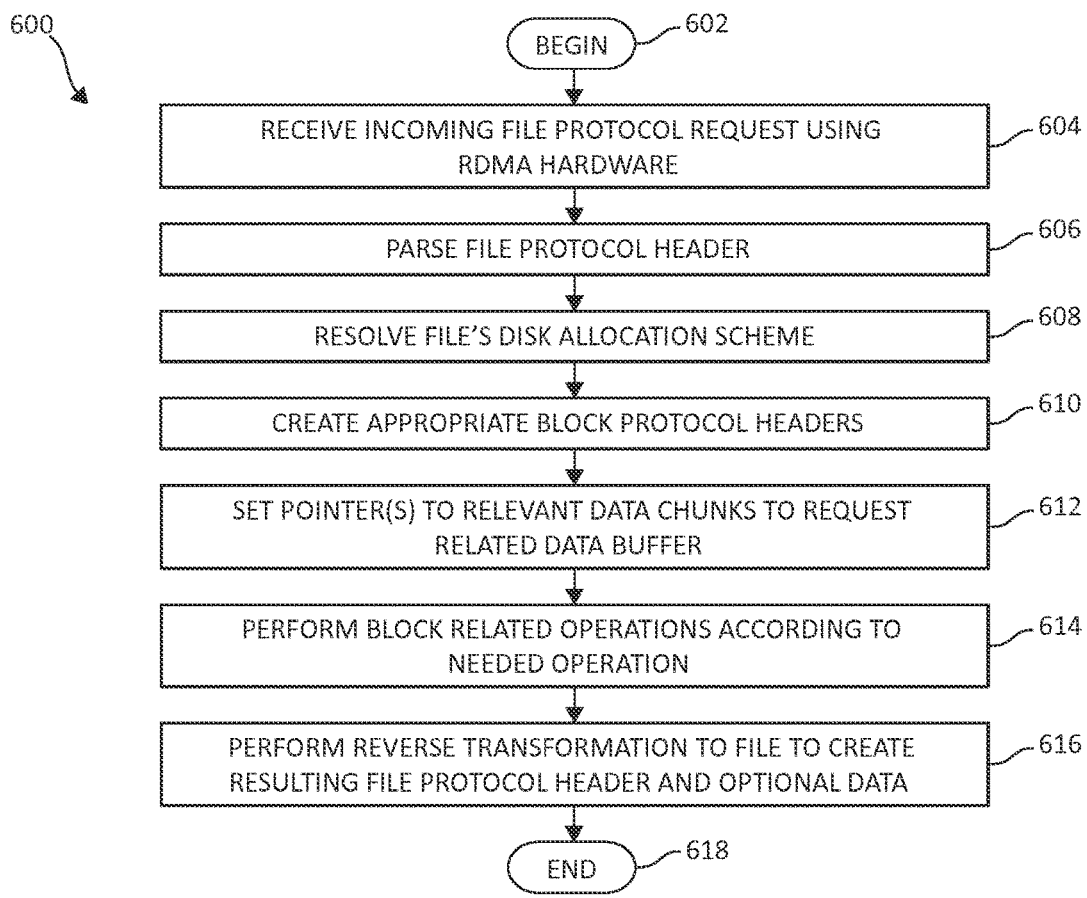
FIG. 6 is an additional flow chart diagram of an additional exemplary method for header transformation and direct data path transfer, here again in which aspects of the present invention may be realized.

Method 600 in FIG. 6, following, illustrates the exemplary header transformation functionality described previously in greater detail. Method 600 begins (step 602) with the receipt of an incoming file protocol request using RDMA hardware (step 604). The file protocol header is then parsed pursuant to the incoming request (step 606). The file's disk allocation scheme (i.e., file system logic operations) are resolved (step 608). This may result in a one-to-many mapping, for example.

In a following step 610, based on the information in the file system previously, the appropriate block protocol header information is created. Pointers to the relevant data chunks to the request related data buffer are set (step 612). The block related operations are then performed according to the needed operation, and block protocol headers and associated data chunks pointers are created using RDMA hardware (step 614).

At a subsequent point, the reverse transformation is then performed to the file, creating the result file protocol header and optional data (in read operations) (step 616). The method 600 then ends (step 618).

Consider the following example of the steps of method 600 described previously in the context of a NFS write operation. The NFS write operation header includes a file ID, offset, and size alongside the data that should be written. Returning to FIG. 6, in step 610, the file system logic replaces this aforementioned file ID, offset and size header information with a relevant header that includes block numbers of the underlying storage without touching the data itself.

As previously mentioned, the mechanisms of the illustrated embodiments are made possible by use of a monolithic solution, where the applicable transport layer is application aware, and vice versa. In other words, for example, both the transport and application layer have intrinsic knowledge of each other, and the usage of RDMA based protocols and hardware to perform data movement operations.

It may again be noted that in one of the aspects of the illustrated embodiments, only the set of RDMA hardware and related protocols allow for the direct transmission in and out of data buffers on from and to the wire. This enables the data to be untouched, without manipulation or movement (e.g., movement into the userspace from the kernel extension). In contrast, the mechanisms of the illustrated embodiments manipulate only the header information. This is made possible because RDMA data is naturally aligned, and therefore handles the alignment constraint of block storage that occurs during the transformation process.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A method for efficient data transfer in a Remote Direct Memory Access (RDMA) operation by a memory device, comprising:
   upon performing the RDMA operation and prior to an initial transmission of any of the data, replacing a file protocol header of the data with a block protocol header wherein a file identification (ID), offset, and size included in the file protocol header is removed and replaced with associated block numbers of the data in the block protocol header, and wherein the block protocol header enables transfer over a direct data path through a transport layer using a small computing systems interface (SCSI) RDMA protocol (SRP) from a source to a target without outside manipulation by a central processing unit (CPU), thereby decreasing latency during the data transfer of the RDMA operation; and
   subsequent to replacing the file protocol header of the data with the block protocol header, retransforming the data by replacing the block protocol header with the file protocol header of the data without modifying any of the data which the subsequently replaced block protocol header describes when performing a read operation from the target to the source.

2. The method of claim 1, further including, in conjunction with replacing the file protocol header, setting at least one pointer to a relevant chunk of the data.

3. The method of claim 1, further including resolving a disk allocation scheme of a file in which the file protocol header is representative.

4. The method of claim 3, further including creating the block protocol header.

5. The method of claim 1, further including parsing the file protocol header.

6. The method of claim 1, further including receiving an incoming file protocol request.

7. A system for efficient data transfer in a Remote Direct Memory Access (RDMA) operation, comprising:
   a memory device, wherein the memory device:
      upon performing the RDMA operation and prior to an initial transmission of any of the data, replaces a file protocol header of the data with a block protocol header wherein a file identification (ID), offset, and size included in the file protocol header is removed and replaced with associated block numbers of the data in the block protocol header, and wherein the block protocol header enables transfer over a direct data path through a transport layer using a small computing systems interface (SCSI) RDMA protocol (SRP) from a source to a target without outside manipulation by a central processing unit (CPU), thereby decreasing latency during the data transfer of the RDMA operation; and
      subsequent to replacing the file protocol header of the data with the block protocol header, retransforms the data by replacing the block protocol header with the file protocol header of the data without modifying any of the data which the subsequently replaced block protocol header describes when performing a read operation from the target to the source.

8. The system of claim 7, wherein the memory device, in conjunction with replacing the file protocol header, sets at least one pointer to a relevant chunk of the data.

9. The system of claim 7, wherein the memory device resolves a disk allocation scheme of a file in which the file protocol header is representative.

10. The system of claim 9, wherein the memory device creates the block protocol header.

11. The system of claim 7, wherein the memory device parses the file protocol header.

12. The system of claim 7, wherein the memory device receives an incoming file protocol request.

13. A computer program product for efficient data transfer in a Remote Direct Memory Access (RDMA) operation by a memory device, the computer program product comprising a non-transitory computer-readable storage medium having computer-readable program code portions stored therein, the computer-readable program code portions comprising:

a first executable portion that, upon performing the RDMA operation and prior to an initial transmission of any of the data, replaces a file protocol header of the data with a block protocol header wherein a file identification (ID), offset, and size included in the file protocol header is removed and replaced with associated block numbers of the data in the block protocol header, and wherein the block protocol header enables transfer over a direct data path through a transport layer using a small computing systems interface (SCSI) RDMA protocol (SRP) from a source to a target without outside manipulation by a central processing unit (CPU), thereby decreasing latency during the data transfer of the RDMA operation; and subsequent to replacing the file protocol header of the data with the block protocol header, retransforms the data by replacing the block protocol header with the file protocol header of the data without modifying any of the data which the subsequently replaced block protocol header describes when performing a read operation from the target to the source.

14. The computer program product of claim 13, further including a second executable portion that, in conjunction with replacing the file protocol header, sets at least one pointer to a relevant chunk of the data.

15. The computer program product of claim 13, further including a second executable portion that resolves a disk allocation scheme of a file in which the file protocol header is representative.

16. The computer program product of claim 15, further including a third executable portion that creates the block protocol header.

17. The computer program product of claim 13, further including a second executable portion that parses the file protocol header.

18. The computer program product of claim 13, further including a second executable portion that receives an incoming file protocol request.

* * * * *